April 29, 1930.   F. C. J. DURSCH   1,756,346
WEED TOPPING ATTACHMENT FOR LAWN MOWERS
Filed Sept. 15, 1928   2 Sheets-Sheet 1
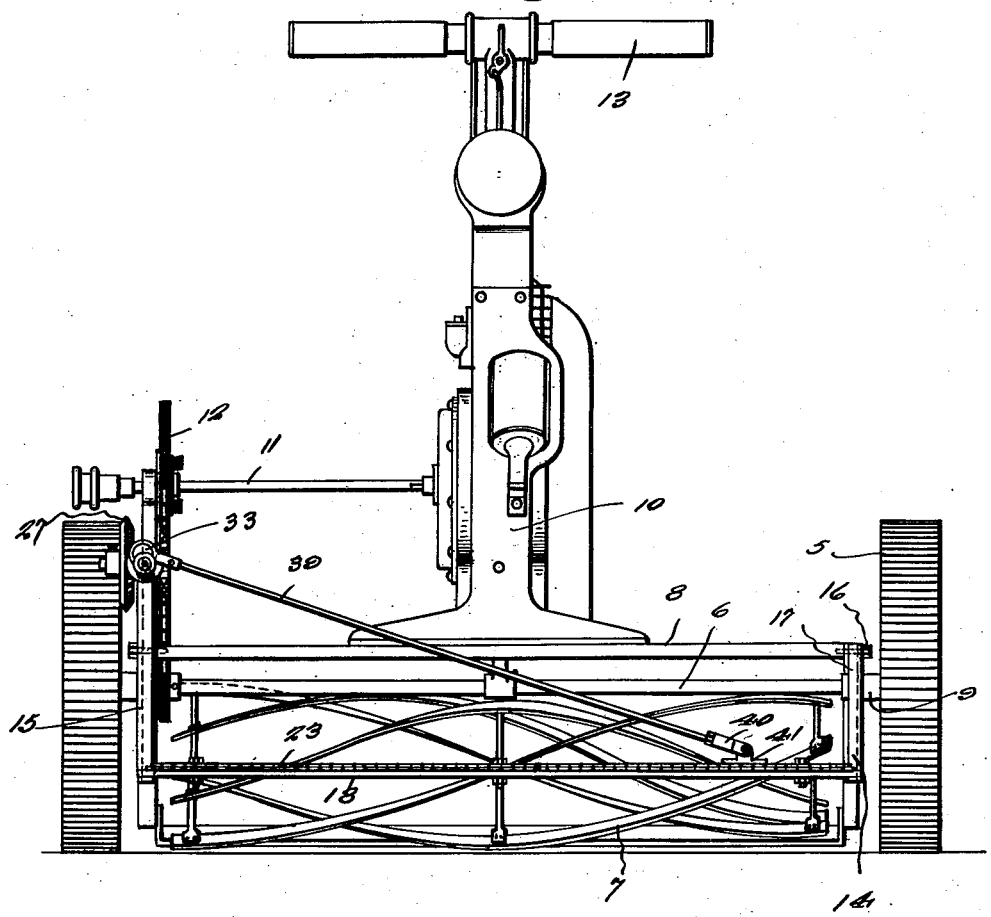
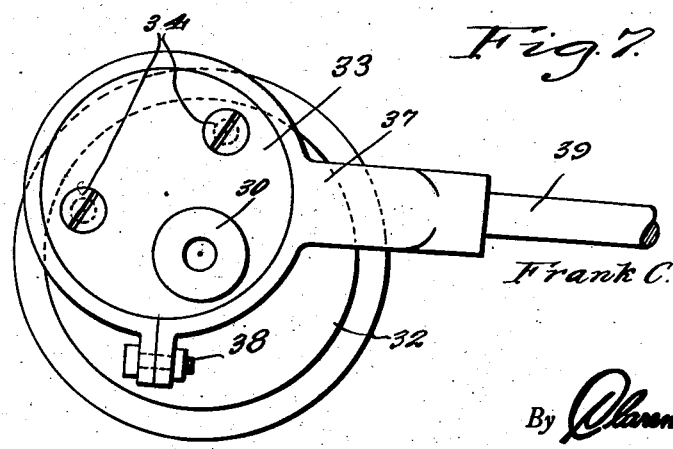
Inventor
Frank C. J. Dursch
By Clarence A. O'Brien
Attorney April 29, 1930. F. C. J. DURSCH 1,756,346
WEED TOPPING ATTACHMENT FOR LAWN MOWERS
Filed Sept. 15, 1928 2 Sheets-Sheet 2
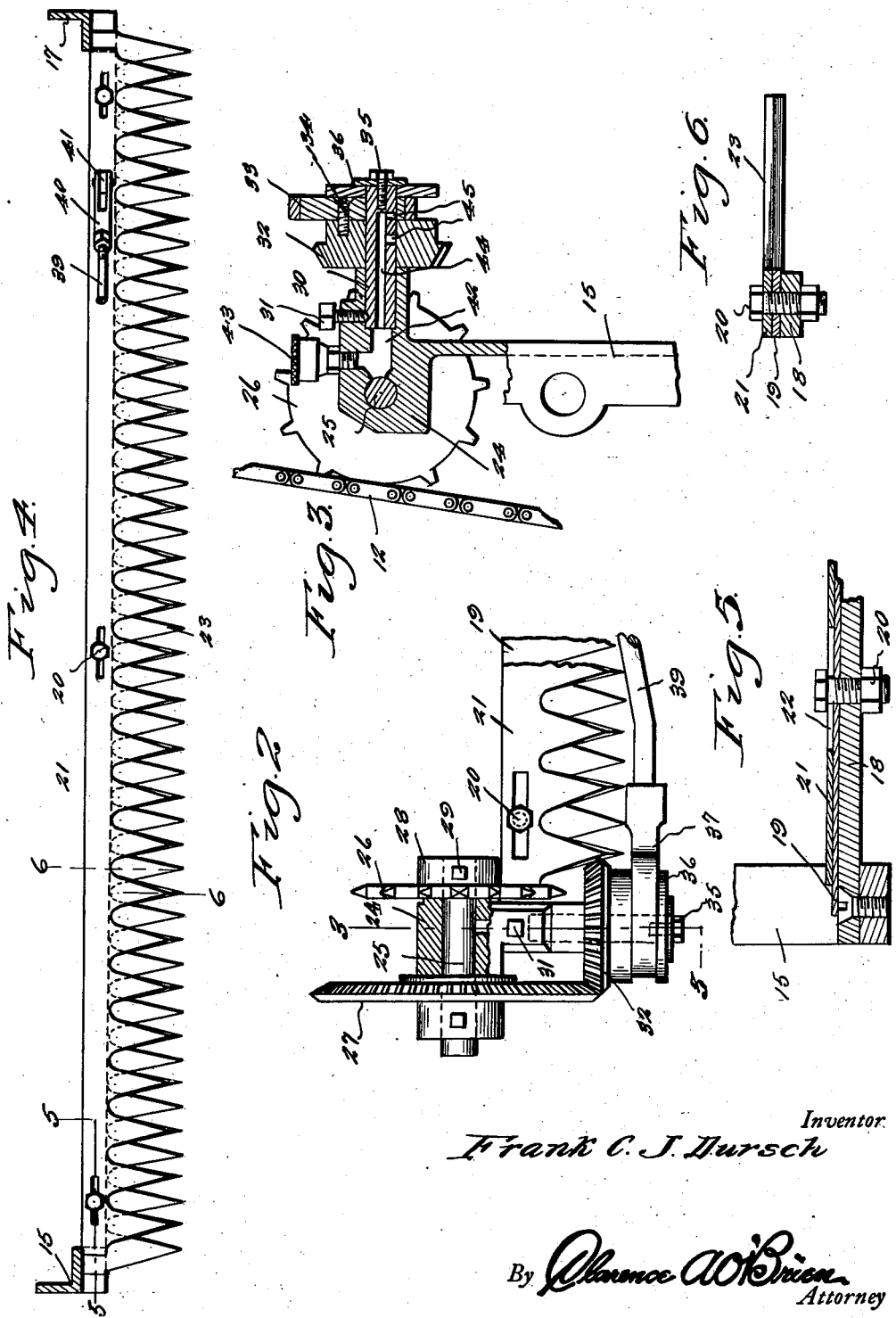

Patented Apr. 29, 1930

1,756,346

UNITED STATES PATENT OFFICE

FRANK C. J. DURSCH, OF PHILADELPHIA, PENNSYLVANIA

WEED-TOPPING ATTACHMENT FOR LAWN MOWERS

Application filed September 15, 1928. Serial No. 306,233.

The present invention relates to attachments for lawn mowers and it has for its object to provide a novel, simple and economical arrangement, which is readily attachable to and removable from ordinary rotary knife lawn mowers, preferably of the motor driven type and which is composed of few and simple parts and possessing novel operating means.

In lawn mowers of the rotary blade type which is the only practical type of machine for cutting grass, it is found that long stemmed grass, weeds and other growth instead of being trimmed off by the rotary knives are pushed aside and remain uncut making it necessary that the lawn be gone over again with a hand knife or other implement to cut off the uncut long stemmed growth.

It is accordingly the purpose of my invention to provide an attachment for an ordinary rotary blade lawn mower having a reciprocating cutter arranged in advance of and preferably in a higher plane than the cutting plane of the rotating knives which will cut off such long stemmed growth to a height where they will be perfectly trimmed by the following rotary knives, such attachment being of simple and economical construction and so arranged as to be readily attached to and detached from the rotary blade lawn mower now generally in use.

One of the important objects of the invention is to provide an attachment of this character adapted for use upon motor driven mowers and arranged for operative connection with the drive means for the rotary blades of the mower without necessitating any changes or alterations in the construction of the mower when used in its usual manner and which does not materially reduce the power provided for the operation of the rotary blade.

Other objects and advantages reside in the special construction and combination of the various elements comprising the invention, reference being had to the accompanying drawings, forming a part hereof, wherein:

Figure 1 is a front elevational view showing the attachment in operative position upon the mower.

Figure 2 is a fragmentary top plan view of the drive connection for the attachment and with parts broken away and shown in section, illustrating the manner of placing the gear and sprocket shaft thereupon.

Figure 3 is a sectional view, taken substantially along the line 3—3 of Figure 2.

Figure 4 is a top plan view of the reciprocating cutter.

Figure 5 is a fragmentary vertical sectional view, of one end of the cutter, taken substantially along the line 5—5 of Figure 4.

Figure 6 is a similar view, taken along the line 6—6 of Figure 4, and

Figure 7 is a detail of the eccentric drive connection for the reciprocating cutter.

Referring now to the drawing in detail, for the purpose of illustration I have disclosed my invention adapted for use upon a lawn mower of conventional construction, and preferably of the motor driven type and which comprises a pair of wheels 5, mounted at the ends of the shaft 6, and which is operatively connected with the rotary cutting blades 7 of the type usually provided for mowers of this character. A frame 8 is supported upon the hub 9 of the wheel and upon which frame is mounted the motor 10 utilized for driving the wheels and the rotary cutter through the drive shaft 11 extending from the motor and a chain and sprocket connection 12 extending between the shafts 6 and 11. A handle 13 extends upwardly from the rear of the motor for steering the motor in the usual manner.

The attachment constituting the subject matter of the present invention is constructed of a substantially U-shaped frame 14 having its opposite sides disposed vertically and with one of said sides, indicated at 15, of an increased length over the other of said sides. Cap screws 16 are utilized for securing the sections of the frame 8 at each side of the forward edges thereof and at the upper end of the short side 17 of the attachment and intermediate the ends of the longer side 15 of the attachment are formed openings through which the cap screws 16 may be inserted for attaching the frame 14 to the sides of the frame 8, as clearly illustrated in Figure 1 of the drawings. The lower ends of the sides 15 and 17 of the attachment are connected by a transversely extending base 18 disposed substantially at a horizontal plane, with the shaft of the rotary cutter 7 and in advance of the blades thereof. Upon the base 18 is mounted a stationary cutting blade 19 by bolts 20, serving to secure the stationary cutter to the base, and upon the stationary cutter is mounted the reciprocating cutter 21, the upper end of the bolt 20 extending through slotted openings 22, formed in the reciprocating cutter, in order to permit limited reciprocable movement of the same. The cutting teeth 23 of each of the cutters 19 and 20 extend forwardly of the frame. The upper end of the side section 15 of the attachment is formed into a bearing box 24, within which is journaled a shaft 25, extending transversely of the machine and with its opposite ends protruding from the opposite sides of the bearing box 24. On one end of the shaft is secured a sprocket wheel 26, and disposed for engagement with the chain 12 and on the opposite end of said shaft is mounted a bevelled gear 27. The sprocket wheel and gear 26 and 27 respectively are keyed on the shaft, in any manner well known in the art and are retained in position thereon by collars 28 secured to the ends of the shaft by set screws 29. Extending forwardly of the bearing box 24 and at right angles to the shaft 25 is a stationary shaft 30 secured at its rear end to the bearing box by a set screw 31, and providing a rotatable mounting at its forward end for a bevelled gear 32, disposed in operative engagement with the gear 27 and to the forward face of which is secured an eccentric 33 by screws 34 or the like. The nut and washer 35 and 36 respectively carried at the outer end of the shaft 30 serve to retain the gear and eccentric in position on said shaft. About the eccentric 33 is fitted a split collar 37 having its split ends secured by a bolt 38 and through means of which the collar may be adjustably secured upon said eccentric. A drive rod 39 is attached at one end to the collar 37 and extends downwardly toward the opposite side of the machine and is threadedly connected at its opposite end with a socket member 40 pivotally attached to a bracket 41, carried on the upper surface of the reciprocating cutter 31. The threaded connection between the rod 29 and the socket member 40 provides a means for adjusting the rod with respect to the reciprocating cutter, and thus control the extent of reciprocable movement thereof.

As clearly illustrated in Figure 3 of the drawings, an oil duct 42 is formed in the bearing box 24, having communication with an oil cup 43, and also with an oil channel 44 formed in the stationary shaft 30.

Oil passages 45 extend from the channel 44 for lubricating the gears 32 and eccentric 33. The oil duct 42 also communicates with the shaft 25, so that all of the working parts are thoroughly lubricated. When mounted in position as illustrated in Figure 1 of the drawings, it will be apparent that upon the operation of the mower, the reciprocating cutter will be operated in advance of the rotary cutter and at a plane above the cutting edge of the latter, so that high stemmed grass, weeds or the like will be topped by the reciprocating cutter and placed in a suitable condition for trimming by the rotary cutter.

It will further be apparent that absolutely no changes in construction of the mower or any parts thereof, are necessary, in order to provide for the operative mounting of the attachment in position thereon, the cap screw 16 at the forward edge of the mower frame 8 being utilized for securing the attachment in operative position thereon. The side members 15 and 17 of the frame of the attachment rest against the forward edge of the frame 8, so that the reciprocating cutters are prevented from swinging rearwardly into contact with the rotary cutter as the machine advances through the grass.

It is obvious that the invention is susceptible of various changes and modifications, without departing from the spirit or scope of the invention or sacrificing any of its advantages, and I accordingly claim all such forms of the device to which I am entitled.

Having thus described my invention, what is claimed is:

1. A topping attachment for lawn mowers comprising a substantially U-shaped frame adapted for attachment forwardly of the mower, a reciprocating cutter carried by the frame and extending transversely of the mower, a power take off means at one side of the frame, and a reciprocating drive rod operatively connected at one end to said power take off means and extending transversely of the mower with its opposite end operatively connected to said cutter, said power take off means comprising a shaft rotatably mounted at the upper end of one side of said frame, a sprocket wheel on the shaft, an eccentric operatively connected with the drive rod, and gears operatively connecting the shaft and the eccentric.

2. A topping attachment for lawn mowers comprising a substantially U-shaped frame adapted for attachment forwardly of the mower, a reciprocating cutter carried by the frame and extending transversely of the mower, a power take off means at one side of the frame, and a reciprocating drive rod operatively connected at one end to said power take off means and extending transversely of the mower with its opposite end operatively connected to said cutter, said power take-off means comprising a shaft rotatably mounted at the upper end of one side of said frame, a sprocket wheel, and a gear wheel secured thereon, a stationary shaft extending forwardly of the frame, a gear rotatable thereon in engagement with said first named gear, and an eccentric attached to said last named gear and operatively connected with said drive rod.

3. A topping attachment for lawn mowers comprising a substantially U-shaped frame having its sides disposed vertically at opposite sides of the frame of the mower and in advance thereof, said vertical sides having bolt openings for receiving bolts carried by the mower frame for securing the frames to each other with the sides of the U-shaped frame moving against the forward edges of the mower frame, one side of said U-shaped frame extending above said securing bolt, a bearing box at the upper end thereof, a shaft journaled for rotation therein with its ends protruding at opposite sides of the box, a sprocket wheel, and a gear wheel mounted on the opposite end of the shaft for rotation thereby, a stationary shaft extending forwardly of the box, a gear freely mounted thereon in engagement with the first named gear, an eccentric secured to one face of the last named gear, a reciprocating cutter carried at the lower edge of the U-shaped frame and extending transversely of the mower, and a rod disposed above the cutter and operatively connecting the eccentric with the end of the cutter remote therefrom.

4. In combination with a lawn mower characterized by a rotary cutter, a motor carried by the mower, and means for operatively connecting the motor to the rotary cutter for driving the rotary cutter and the mower; a frame adapted for attachment to the mower, a reciprocating cutter carried by the frame disposed forwardly of the rotary cutter and transversely of the mower, a power take-off mechanism supported on the frame and associated with said connecting means, and a connecting rod having its opposite ends connected to the reciprocating cutter and power take-off mechanism respectively.

5. The combination in a lawn mower, of a motor, a rotary cutter, a reciprocating cutting mechanism, driving means intermediate of the motor, on the one hand, and the rotary cutter, and the reciprocating cutting mechanism on the other, and means for mounting the reciprocating cutting mechanism forwardly of the rotary cutter.

In testimony whereof I affix my signature.

FRANK C. J. DURSCH.